(12) United States Patent
Sasaki et al.

(10) Patent No.: US 9,317,084 B2
(45) Date of Patent: Apr. 19, 2016

(54) THERMAL DISPLACEMENT COMPENSATING DEVICE AND METHOD FOR A MACHINE TOOL

(75) Inventors: Yuji Sasaki, Takahama (JP); Hideki Iwai, Toyoake (JP); Yasumasa Sakurai, Kariya (JP); Kimihiro Onishi, Kasugai (JP); Yoshio Wakazono, Nagoya (JP); Yoshiji Yamamoto, Toyohashi (JP)

(73) Assignee: JTEKT Corporation, Osaka-shi (JP)

( * ) Notice: Subject to any disclaimer, the term of this patent is extended or adjusted under 35 U.S.C. 154(b) by 487 days.

(21) Appl. No.: 13/809,937

(22) PCT Filed: May 16, 2012

(86) PCT No.: PCT/JP2012/062560
§ 371 (c)(1),
(2), (4) Date: Jan. 14, 2013

(87) PCT Pub. No.: WO2012/157687
PCT Pub. Date: Nov. 22, 2012

(65) Prior Publication Data
US 2013/0116851 A1 May 9, 2013

(30) Foreign Application Priority Data

May 17, 2011 (JP) .................................. 2011-110537

(51) Int. Cl.
*G06F 1/20* (2006.01)
*G05B 19/404* (2006.01)
(52) U.S. Cl.
CPC .............. *G06F 1/206* (2013.01); *G05B 19/404* (2013.01); *G05B 2219/49206* (2013.01); *G05B 2219/49212* (2013.01)
(58) Field of Classification Search
None
See application file for complete search history.

(56) References Cited

U.S. PATENT DOCUMENTS 5,754,181 A * 5/1998 Amdursky et al. ........... 345/419
6,434,435 B1 * 8/2002 Tubel et al. ..................... 700/30
(Continued)

FOREIGN PATENT DOCUMENTS

CN 101804581 8/2010
JP 6 190687 7/1994
(Continued)

OTHER PUBLICATIONS

Fish et al., "Multiscale analysis of composite materials and structures", 2000, Composites Science and Technology vol. 60, pp. 2547-2556.*

(Continued)

*Primary Examiner* — Mohammad Ali
*Assistant Examiner* — Bernard G Lindsay
(74) *Attorney, Agent, or Firm* — Oblon, McClelland, Maier & Neustadt, L.L.P.

(57) ABSTRACT

In a thermal displacement compensating device and a thermal displacement compensating method for a machine tool, a block temperature obtaining section obtains temperatures of respective blocks based on temperature information detected by temperature sensors wherein temperatures in each of the respective blocks into which a column is divided to be pluralized are defined as a uniform value. An FEM analysis section performs a structural analysis by a finite element method based on the temperatures of the respective blocks obtained by the block temperature obtaining section and infers thermal displacement amounts of the column. A compensation value calculation section calculates a compensation value for a machining command position based on the thermal displacement amounts of the column inferred by the FEM analysis section. A compensation section compensates the machining command position by the compensation value obtained by the compensation value calculation section.

18 Claims, 9 Drawing Sheets

(56) References Cited

U.S. PATENT DOCUMENTS

2003/0065419 A1* 4/2003 Fujishima et al. ............ 700/176
2010/0152881 A1* 6/2010 Ou et al. ...................... 700/160

FOREIGN PATENT DOCUMENTS

| JP | 2003 108206 | 4/2003 |
| JP | 2004 237394 | 8/2004 |
| JP | 2006 65716 | 3/2006 |
| JP | 2011-056655 | 3/2011 |
| JP | 2011-161614 | 8/2011 |
| TW | 201021959 | 6/2010 |

OTHER PUBLICATIONS

Zhu et al., "Robust Machine Tool Thermal Error Modeling Through Thermal Mode Concept", 2008, Journal of Manufacturing Science and Engineering vol. 130, pp. 061006-1-061006-9.*
Brauer, Finite Element Analysis, Second Edition, published by Marcel Dekker, Inc., 1993, p. 12.*
International Search Report Issued Aug. 14, 2012 in PCT/JP12/62560 Filed May 16, 2012.
U.S. Appl. No. 14/311,813, Jun. 23, 2014, Sasaki et al.
Office Action issued in Chinese Application No. 201280003066.5 dated Jun. 26, 2015.
Decision to Grant a Patent in Japanese Application No. 2012-549187 dated Aug. 18, 2015.

* cited by examiner

THERMAL DISPLACEMENT COMPENSATING DEVICE AND METHOD FOR A MACHINE TOOL

TECHNICAL FIELD

The present invention relates to a thermal displacement compensating device and a thermal displacement compensating method in a machine tool.

BACKGROUND ART

JP6-190687 A, JP2003-108206 A and JP2004-237394 A describe performing a structural analysis by a finite element method and inferring thermal displacement amounts of a structural body of a machine tool.

SUMMARY OF THE INVENTION

Problem to be Solved by the Invention

However, since the time taken for a structural analysis by a finite element method was very long, it was not easy to infer thermal displacement amounts during a machining on a real time basis. Thus, while a structural analysis was being performed, a thermal displacement compensation had to be made based on the result of a structural analysis that had been performed just before. Accordingly, differences often occurred between actual thermal displacement amounts and inferred thermal displacement amounts, so that it was impossible to perform a thermal displacement compensation accurately.

The present invention has been made taking these circumstances into consideration, and an object thereof is to provide a thermal displacement compensating device and a thermal displacement compensating method for a machine tool wherein a thermal displacement compensation can be performed accurately on a real time basis as a result of making it possible to perform a structural analysis by a finite element method at a high speed.

Measures for Solving the Problem (Thermal Displacement Compensating Device for Machine Tool)

A thermal displacement compensating device for a machine tool according to the present measures comprises temperature sensors arranged at predetermined portions on a structural body of the machine tool; block temperature obtaining means that obtains temperatures of respective blocks based on temperature information detected by the temperature sensors wherein temperatures in each of the respective blocks into which the structural body of the machine tool is divided to be pluralized are defined as a uniform value; finite element method analysis means that performs a structural analysis by a finite element method based on the temperatures of the respective blocks obtained by the block temperature obtaining means and that infers thermal displacement amounts of the structural body of the machine tool; compensation value calculation means that calculates a compensation value for a command position by a numerical control (NC) program of a movable body of the machine tool based on the thermal displacement amounts of the structural body of the machine tool inferred by the finite element method analysis means; and compensation means that compensates the command position by the compensation value obtained by the compensation value calculation means.

According to the present measures, as a temperature condition in performing the structural analysis by the finite element method, the structural body of the machine tool is divided into the plurality of blocks, and temperatures in each block are set as a uniform value. Thus, the temperature conditions at nodes included in the same block become the same value. Then, based on a fundamental expression for the structural analysis by the finite element method and a relational expression for nodal forces depending on nodal temperatures, thermal displacement amount vectors at respective nodes are expressed as $\{\delta\}=[K]^{-1}[F]\{T\}$. Here, $\{\delta\}$ represents the thermal displacement amount vectors at respective nodes, $[K]$ represents a stiffness matrix for the structural body, $[F]$ represents a force coefficient matrix at the respective nodes, and $\{T\}$ represents temperature vectors at the respective blocks. The vectors used in the present description all means column vectors.

Here, the number of elements for the temperature vectors $\{T\}$ at the respective blocks corresponds to the number of the blocks and can greatly be decreased in comparison with the number of the respective nodes. Thus, it is possible to greatly decrease the quantity of calculations for the thermal displacement amount vectors $\{\delta\}$ at the respective nodes. Accordingly, it is possible to speed up the calculation speed for the thermal displacement amount vectors $\{\delta\}$ at the respective nodes. Then, the calculations are done on a real time basis during a machining, and the thermal displacement compensation is carried out. In this way, since the structural analysis by the finite element method can be executed at a high speed, it is possible to perform the thermal displacement compensation accurately on a real time basis.

Further, the finite element method analysis means may perform the structural analysis by the finite element method and may infer thermal displacement amounts at a part of nodes on the structural body of the machine tool, and the compensation value calculation means may calculate the compensation value based on the inferred thermal displacement amounts at the part of the nodes on the structural body of the machine tool.

In this case, the thermal displacement amounts at the part of the nodes on the structural body are inferred. Here, for performing the thermal displacement compensation, it is unnecessary to grasp the thermal displacement amounts at all of portions on the structural body. Therefore, it is possible to further decrease the quantity of calculations by obtaining thermal displacement amounts at necessary portions only. As a result, it is possible to further shorten the time taken for the structural analysis by the finite element method and to realize a real time capability which has been further enhanced.

Further, where the structural body of the machine tool has a sliding surface for sliding another movable body of the machine tool thereon, the part of the nodes may be determined as nodes residing at the sliding surface that is on the structural body of the machine tool for sliding the movable body of the machine tool thereon.

Where the structural body has the sliding surface for sliding the movable body thereon, the thermal displacement of the sliding surface on the structural body influences the position of the movable body that slides on the sliding surface of the structural body. That is, the thermal displacement of the sliding surface on the structural body influences machining points. Therefore, by setting nodes residing at the sliding surface as the part of the nodes for which thermal displacement amounts are calculated through the structural analysis by the finite element method, it is possible to reliably infer the thermal displacement amount to be compensated.

Further, the part of the nodes may be set to be at a supporting reference position for a ball screw that moves the movable body of the machine tool relative to the structural body of the machine tool.

Generally, since the ball screw expands with heat, one of a plurality of positions supporting the ball screw on the structural body is determined as the supporting reference position. That is, even where the ball screw expands, the supporting reference position of the ball screw on the structural body is made not to move. However, when the structural body itself is displaced thermally, it results that the supporting reference position itself for the ball screw is displaced. Therefore, where the structural body has the supporting reference position thereon for the ball screw, a thermal displacement amount at the supporting reference position for the ball screw influences the position of the movable body. That is, machining points are affected by the thermal displacement at the supporting reference position for the ball screw on the structural body. Thus, it is possible to reliably infer the thermal displacement amount to be compensated by determining, as the supporting reference position for the ball screw, the part of nodes whose thermal displacement amounts are calculated through the structural analysis by the finite element method.

Further, the structural body may be supported movably relative to a support body, the thermal displacement compensating device may be provided with memory means that stores a plurality of coefficient matrices corresponding to the supporting stiffness at a plurality of reference positions of the structural body, and the finite element method analysis means may perform the structural analysis by the finite element method based on the plurality of coefficient matrices and the temperatures of the respective blocks and may infer the thermal displacement amounts of the structural body of the machine tool.

Here, it may occur that the movably structural body differs in supporting stiffness in dependence on the position. Thus, by inferring the thermal displacement amounts of the structural body by the use of the plurality of coefficient matrices corresponding to the supporting stiffness at the plurality of reference positions, it is possible to accurately calculate a compensation value for a command position of the movable body at the present position.

Further, the finite element method analysis means may infer the thermal displacement amounts of the structural body at the respective reference positions of the structural body based on the plurality of coefficient matrices and the temperatures of the respective blocks, and the compensation value calculation means may calculate by an interpolation method a compensation value for a command position of the movable body at the present position of the structural body based on the thermal displacement amounts of the structural body at the respective reference positions and the present position of the structural body.

When the present position agrees with either of the reference positions, the thermal displacement amounts of the structural body are inferred by the use of the coefficient matrix for the reference position, and the compensation value for the command position of the movable body is calculated by the use of the thermal displacement amounts. In this case, the calculated compensation value corresponds to the compensation value for the present position. On the other hand, when the present position does not agree with either of the reference positions, the compensation value can be calculated by the interpolation method based on the thermal displacement amounts calculated from the plurality of reference positions. In this way, through calculations by the interpolation method, it is possible to accurately calculate the compensation value for the present position.

Further, where the structural body of the machine tool has a sliding surface for sliding another movable body of the machine tool thereon, the blocks may be defined to divide the structural body of the machine tool into the sliding surface side and a non-sliding surface side.

Where the structural body has the sliding surface for sliding the movable body thereon, there is generated a temperature gradient between the sliding surface side and the non-sliding surface side due to the difference in thermal capacity between the sliding surface side and the non-sliding surface side, the influence of heat generation and the like. So, even where the temperatures within each block are defined as a uniform value, it is possible to grasp the state close to the actual temperatures by dividing the structural body into the sliding surface side and the non-sliding surface side in dividing the structural body into the plurality of blocks. Consequently, it is possible to infer the thermal displacement amounts accurately.

Further, the thermal displacement compensating device for a machine tool may further comprise block change means that changes a division mode for the blocks based on temperature information detected by the temperature sensors.

Since the block change means is provided, it is possible to properly change the division mode for the blocks in dependence on the state of the structural body of the machine tool. For example, the respective blocks are defined so that the range of temperatures in the same block is included in a set range. Thus, even where the temperatures in the same block are defined to the same value, it is possible to grasp the state close to the actual temperatures of the structural body of the machine tool. As a result, it is possible to infer the thermal displacement amounts accurately.

(Thermal Displacement Compensating Method for Machine Tool)

Further, a thermal displacement compensating method for a machine tool according to the present measures comprises a block temperature obtaining step of obtaining temperatures of respective blocks based on temperature information detected by temperature sensors arranged at predetermined portions on a structural body of the machine tool wherein temperatures in each of the respective blocks into which the structural body of the machine tool is divided to be pluralized are defined as a uniform value; a finite element method analysis step of performing a structural analysis by a finite element method based on the temperatures of the respective blocks obtained at the block temperature obtaining step and of inferring thermal displacement amounts of the structural body of the machine tool; a compensation value calculation step of calculating a compensation value for a command position by a numerical control (NC) program of a movable body of the machine tool based on the thermal displacement amounts of the structural body of the machine tool inferred at the finite element method analysis step; and a compensation step of compensating the command position by the compensation value obtained at the compensation value calculation step.

According to the thermal displacement compensating method for a machine tool according to the present measures, the same effects as the aforementioned effects in the thermal displacement compensating device for a machine tool can be achieved.

EMBODIMENTS FOR PRACTICING THE INVENTION

First Embodiment (1. Machine Construction of Machine Tool)

As one example of a machine tool 1, a horizontal machining center will be exemplified and described with reference to FIGS. 1 and 2. That is, the machine tool is a machine tool which has, as drive axes, three straight drive axes (X, Y, Z axes) perpendicular to one another and a rotational axis (B-axis) extending in a vertical direction.

Figure 1:
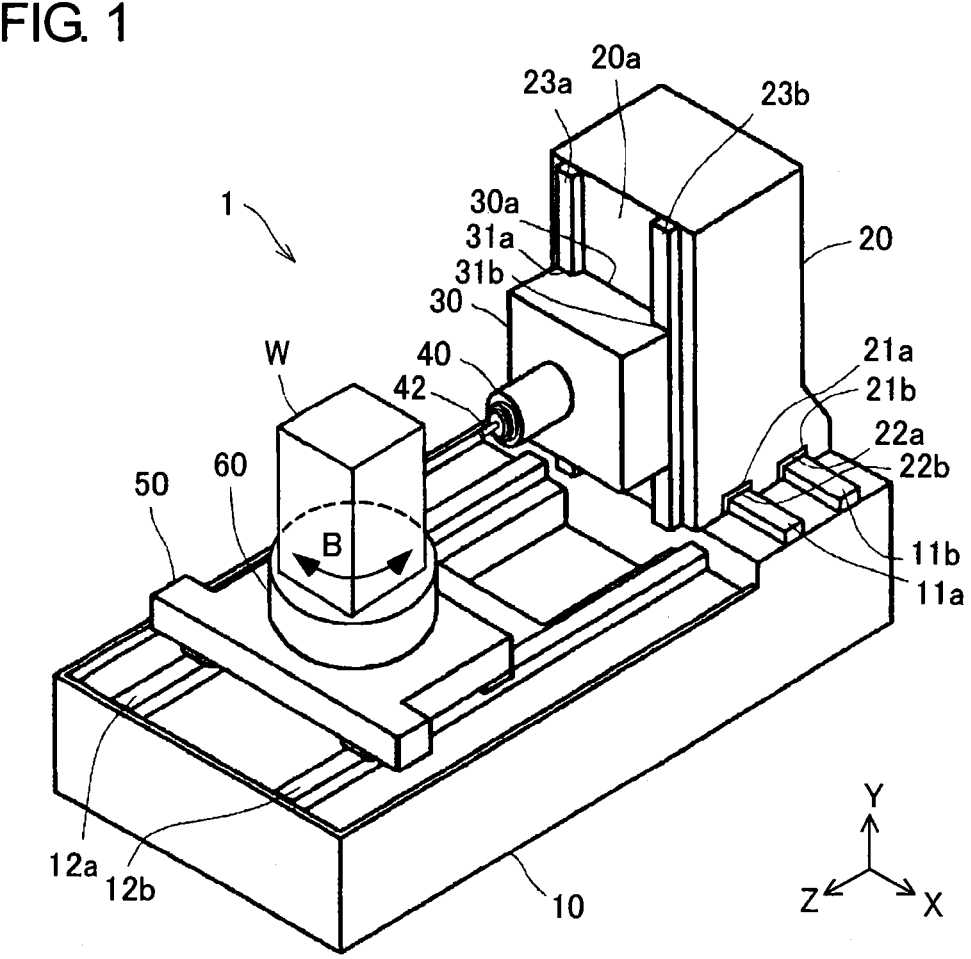
FIG. 1 is a perspective view showing the entire construction of a machine tool in embodiments of the present invention.
Figure 2:
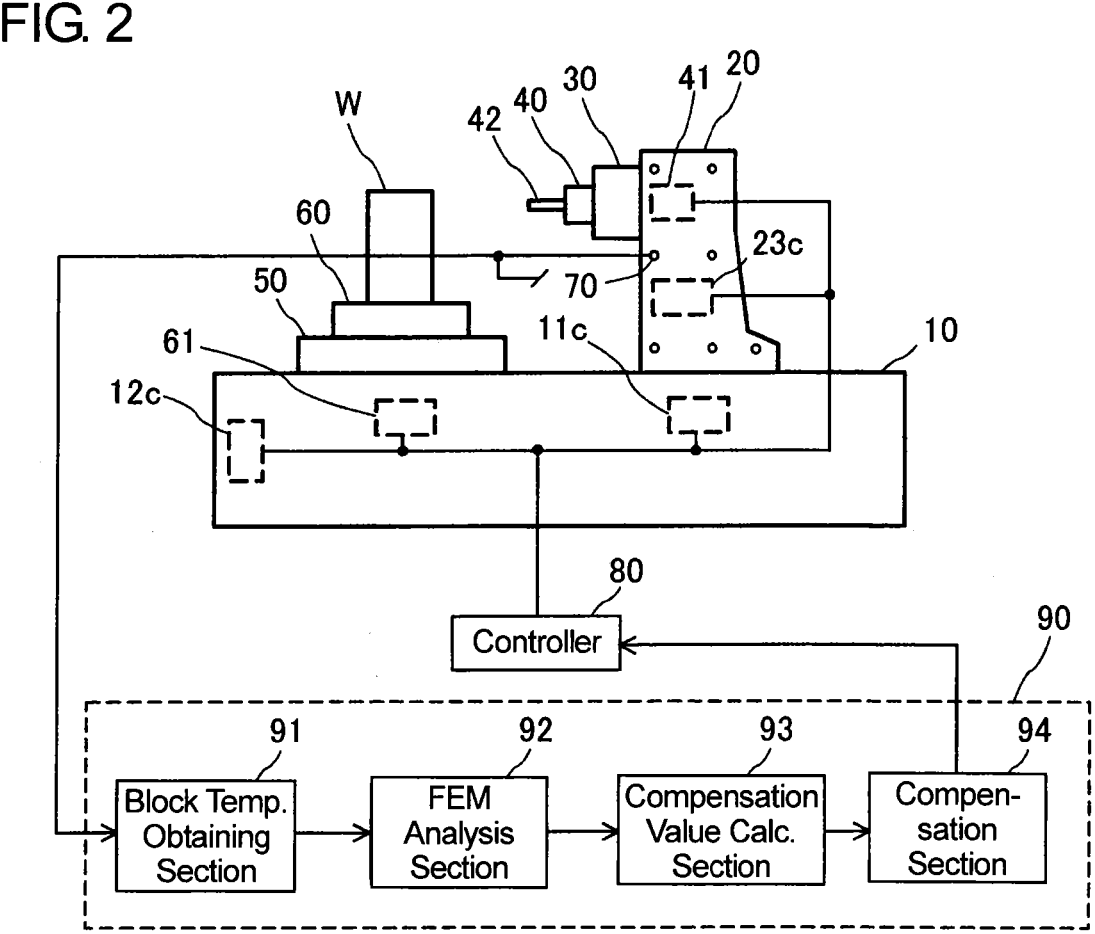
FIG. 2 is a diagram showing a thermal displacement compensating device in a first embodiment of the present invention.

As shown in FIGS. 1 and 2, the machine tool 1 is composed of a bed 10, a column 20, a saddle 30, a rotational tool spindle 40, a table 50, a turn table 60, temperature sensors 70, a controller 80, and a thermal displacement compensating device 90.

The bed 10 takes an almost rectangular shape and is arranged on a floor. However, the shape of the bed 10 is not limited to the rectangular shape. On the upper surface of the bed 10, a pair of X-axis guide rails 11a, 11b along which the column 20 is slidable are formed to extend in an X-axis direction (horizontal direction) and to be in parallel to each other. Further, on the bed 10, an X-axis ball screw (not shown) is arranged between the pair of X-axis guide rails 11a, 11b for driving the column 20 in the X-axis direction, and an X-axis motor 11c is arranged for rotationally driving the X-axis ball screw.

Further, on the upper surface of the bed 10, a pair of Z-axis guide rails 12a, 12b along which the table 50 is slidable are formed to extend in a Z-axis direction (horizontal direction) perpendicular to the X-axis direction and to be in parallel to each other. Further, on the bed 10, a Z-axis ball screw (not shown) for diving the table 50 in the Z-axis direction is arranged between the pair of Z-axis guide rails 12a, 12b, and a Z-axis motor 12c is arranged for rotationally driving the Z-axis ball screw.

On the bottom surface (X-axis sliding surface) of the column 20, a pair of X-axis guide grooves 21a, 21b are formed to extend in the X-axis direction and to be in parallel to each other. For the column 20 to be movable relative to the bed 10 in the X-axis direction, the pair of X-axis guide grooves 21a, 21b are fitted on the pair of X-axis guide rails 11a, 11b through ball guides 22a, 22b.

Further, on a side surface (Y-axis sliding surface) 20a parallel to a Y-axis of the column 20, a pair of Y-axis guide rails 23a, 23b along which the saddle 30 is slidable are formed to extend in a Y-axis direction (vertical direction) and to be in parallel to each other. Further, on the column 20, a Y-axis ball screw (not shown) for driving the saddle 30 in the Y-axis direction is arranged between the pair of Y-axis guide rails 23a, 23b, and a Y-axis motor 23c is arranged for rotationally driving the Y-axis ball screw.

On a side surface 30a of the saddle 30 facing the Y-axis sliding surface 20a of the column 20, a pair of Y-axis guide grooves 31a, 31b are formed to extend in the Y-axis direction and to be in parallel to each other. For the saddle 30 to be movable relative to the column 20 in the Y-axis direction, the pair of Y-axis guide grooves 31a, 31b are fitted on the pair of Y-axis guide rails 23a, 23b.

The rotational tool spindle 40 is provided rotatably by a tool spindle motor 41 housed in the saddle 30 and supports a tool 42. The tool 42 is fixed on an end of the rotational tool spindle 40 and rotates with the rotation of the rotational tool spindle 40. Further, the tool 42 moves relative to the bed 10 in the X-axis direction and the Y-axis direction with the movements of the column 20 and the saddle 30. As the tool 42, for example, there is a ball end mill, an end mill, a drill, a screw tap or the like.

The table 50 is provided on the pair of Z-axis guide rails 12a, 12b to be movable relative to the bed 10 in the Z-axis direction. On the upper surface of the table 50, the turn table 60 is supported rotatably about the B-axis extending in the vertical direction. The turn table 60 is provided rotatably by a B-axis motor 61 housed in the bed 10 and secures thereon a workpiece W with jigs, by means of magnetic attraction or the like.

The temperature sensors 70 are attached to arbitrary portions on respective structural bodies of the machine tool 1, that is, on the bed 10, the column 20, the saddle 30, the rotational tool spindle 40, the table 50, and the turn table 60. As the temperature sensors 70, for example, there are used thermocouples and thermistors. The temperature information detected by the temperature sensors 70 is utilized for structural analyses of the respective structural bodies of the machine tool 1.

The controller 80 controls the tool spindle motor 41 to rotate the tool 42, controls the X-axis motor 11c, the Z-axis motor 12c, the Y-axis motor 23c and the B-axis motor 61 to relatively move the workpiece W and the tool 42 in the X-axis direction, the Z-axis direction and the Y-axis direction and about the B-axis, so that the workpiece W is machined. Further, the controller 80 is provided with the thermal displacement compensating device 90 that performs thermal displacement compensations in order to cancel deviation in relative position between the workpiece W and the tool 42 occurring with thermal displacements of the structural bodies such as the bed 10, the column 20 and the like. However, the thermal displacement compensating device 90 is not limited to one provided in the controller 80 and may be applicable as a peripheral device.

(2. General Description of Thermal Displacement Compensation)

Next, description will be made regarding the outline of the thermal displacement compensation by the thermal displacement compensating device 90. In the present embodiment, with reference to FIG. 3, description will be made regarding the case wherein the thermal displacement compensation that follows thermal displacements is performed for the column 20 being one of the structural bodies of the machine tool 1. The same application is possible to other structural bodies such as the bed 10 and the like in addition to the column 20.

Figure 3:
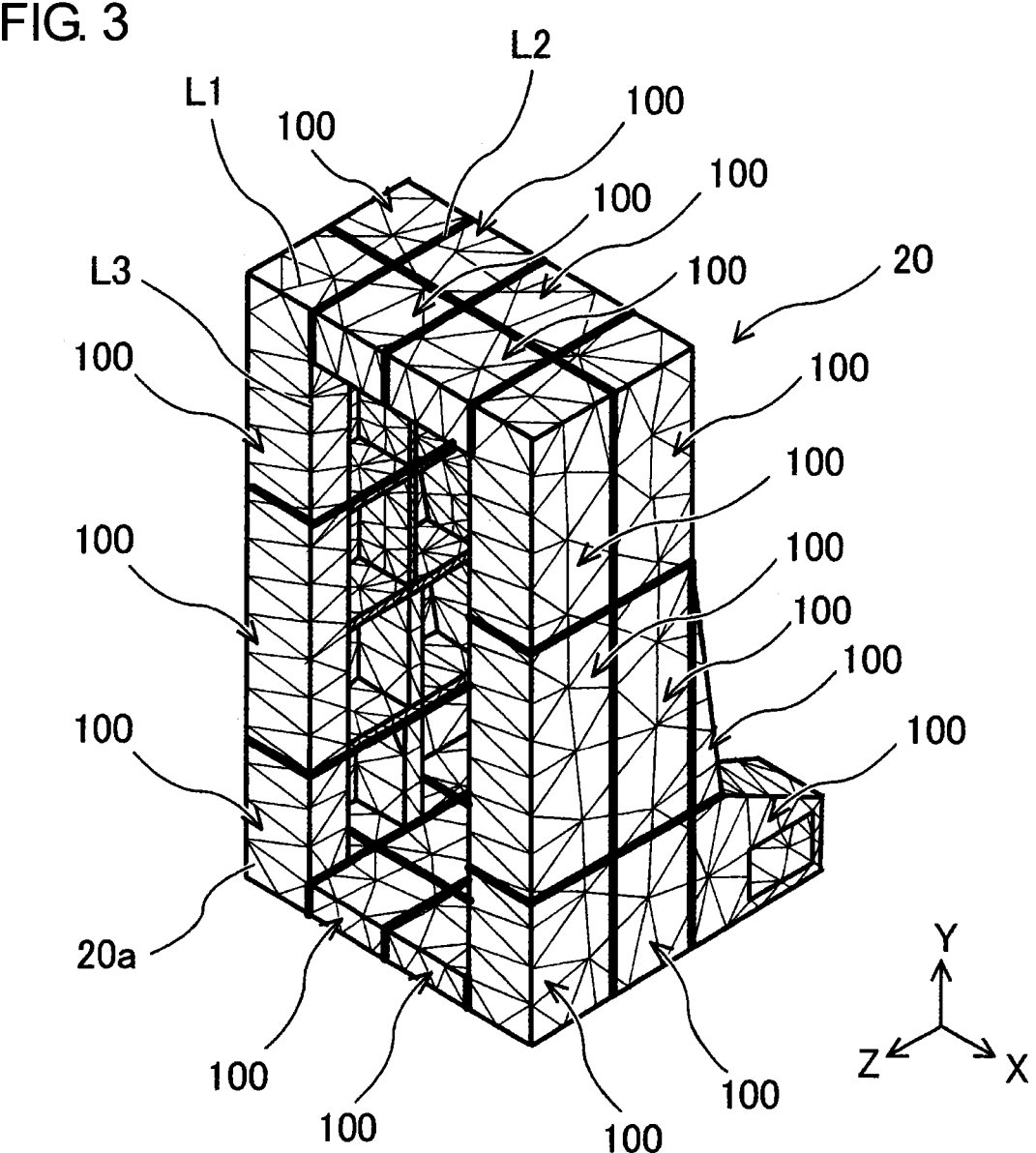
FIG. 3 is a perspective view showing linear elements (thin lines) and blocks (thick lines) of a tetrahedron in the case of executing the structural analysis of a column by a finite element method.

In FIG. 3, there are used thin lines L1, thick lines L2 and medium thick lines L3. Here, the medium thick lines L3 are forming lines of the column 20. The thin lines L1 show boundary line segments of elements in a structural analysis by a finite element method, wherein the vertexes of each thin line L1 are set as nodes. That is, in FIG. 3, the elements constitute tetrahedral linear elements. Further, in FIG. 3, the thick lines L2 represent dividing lines for blocks 100, 100, . . . . That is, the dimensions of the respective blocks 100 are set to be larger than the dimensions of the respective elements in the structural analysis by the finite element method. Accordingly, one block 100 includes a large number of elements and a larger number of nodes. Here, although in FIG. 3 exemplifying the present embodiment, one element is illustrated as a tetrahedral linear element, the application is also possible to a tetrahedral quadratic element, a hexahedral linear element, a hexahedral quadratic element or the like without being limited to the tetrahedral linear element.

Then, based on the elements shown by the thin lines in FIG. 3, the structural analysis of the column 20 is performed by the finite element method on a real time basis, thermal displacement amounts at a part of the nodes on the column 20 are inferred, and compensation values for machining command positions are calculated based on the thermal displacement amounts. The machining command positions are compensated by the compensation values. Here, the machining command positions mean position command values for a movable body of the machine tool 1 that are commanded by a numerical control (NC) program for performing machining, measurement or the like. For example, the machining command positions and the compensation values determine command values for the end position of the rotational tool spindle 40 relative to the workpiece W, that is, the command values of the end position of the tool 42 relative to the workpiece W. Further, the machining command positions can also be grasped as command positions to the respective axis motors. The machining command positions are expressed on the X-axis, Y-axis, Z-axis and B-axis coordinates in the machine tool 1 of the present embodiment. The compensation values are expressed as those on the X-axis, Y-axis, Z-axis coordinates for performing compensations to the X-axis, the Y-axis and the Z-axis.

Here, in performing the structural analysis of the column 20 by the finite element method, temperatures at respective nodes are required as conditions for analysis. However, in the present embodiment, the column 20 is divided into a plurality of blocks 100, 100, . . . indicated by the thick lines L2 in FIG. 3, and the structural analysis is performed on the assumption that temperatures at the plurality of nodes included in the same block 100, 100, . . . are a uniform value. Further, calculations are made there not for the thermal displacement amounts at all of the nodes but for the thermal displacement amounts at requisite portions only such as, for example, the Y-axis sliding surface 20a of the column 20. As a result, it is possible to greatly decrease calculations for the structural analysis by the finite element method, and to speed up the calculations.

As shown in FIG. 3, the respective blocks 100, 100, . . . are defined by dividing the column 20 as follows. That is, the column 20 is divided (in the Z-axis direction) into a Y-axis sliding surface 20a side which slides the saddle 30 in the Y-axis direction on the column 20, and an opposite side (back side) to the Y-axis sliding surface 20a and is divided (in the Y-axis direction) into the X-axis guide grooves 21a, 21b side of the column 20 (an X-axis sliding surface side where the column 20 itself slides relative to the bed 10) and an opposite side to the X-axis sliding surface. Here, the column 20 is divided into twenty-four blocks 100.

(3. Construction of Thermal Displacement Compensating Device)

Next, the thermal displacement compensating device 90 will be described with reference to FIG. 2. The thermal displacement compensating device 90 is constructed to be provided with a block temperature obtaining section 91, an FEM analysis section 92, a compensation value calculation section 93 and a compensation section 94. Here, the block temperature obtaining section 91, the FEM analysis section 92, the compensation value calculation section 93 and the compensating section 94 may be constructed respectively by individual hardware units or may be respectively realized by software.

The block temperature obtaining section 91 obtains the temperatures of the respective blocks 100, 100, . . . into which the column 20 is divided to be pluralized as shown in FIG. 3, based on the temperature information detected by the temperature sensors 70. Here, actual temperatures at respective portions of the columns 20 differ from one another. Thus, portions which differ in temperature exist even within the same block 100. However, the temperatures of respective portions within the same block 100 are defined as a uniform value, which is then used as temperature information on the analysis condition in the structural analysis by the finite element method in the present embodiment.

On the column 20, there is arranged at least one temperature sensor, preferably, a plurality of temperature sensors 70. Further, the block temperature obtaining section 91 obtains the temperatures of the respective blocks 100 based on the temperature information detected by the temperature sensor 70. For example, grasping a temperature gradient of the column 20 in advance makes it possible to calculate the temperatures of the respective blocks 100 based on the temperature information detected by the temperature sensors 70. For example, there are used temperatures at center parts of the respective blocks 100 as the temperatures of the respective blocks 100. Where one temperature sensor 70 is arranged in each block 100, it is possible to use as the temperatures of the respective blocks 100 the temperature information detected by the respective temperature sensors 70.

The FEM analysis section 92 (corresponding to the "finite element method analysis means" in the present invention) performs the structural analysis of the column 20 by the finite element method and infers the thermal displacement amounts at the Y-axis sliding surface 20a of the column 20. As conditions for the structural analysis, there become necessary a material constant, the temperature information on respective nodes, constraint conditions and spring elements at supporting portions. Here, of the conditions for structural analysis, only the temperature information at respective nodes is variable, and other conditions have already been known. Then, the temperatures of the respective blocks 100, 100 . . . obtained by the block temperature obtaining section 91 are used as the temperature information at the respective nodes. That is, the temperature information at all of the nodes included in the same block 100 becomes the same value.

The structural analysis by the finite element method under the conditions like this can be expressed by a matrix calculation expression (1). The number of times for calculations in the expression (1) becomes $N_{part1} \times 2 \times N_{block}$ times. The derivation method for the expression (1) in the structural analysis will be described later.

[Mathematical Expression 1]

$$\{\delta_{part1}\} = [P1_{part1}]\{T_{block}\} \quad (1)$$

$\{\delta_{part1}\}$: Thermal displacement amount vectors at nodes on Y-axis sliding surface of column (number of elements: $N_{part1}$)

$[P1_{part1}]$: Coefficient matrix (number of rows: $N_{part1}$, number of columns: $N_{block}$)

$\{T_{block}\}$: Temperature vectors of respective blocks (number of elements: $N_{block}$)

The compensation value calculation section 93 (corresponding to the "compensation value calculation means" in the present invention) calculates compensation values for the machining command positions based on the thermal displacement amounts at the Y-axis sliding surface 20a of the column 20 obtained by the FEM analysis section 92. The compensation section 94 (corresponding to the "compensation means" in the present invention) compensates the machining command positions by the compensation values obtained by the compensation value calculation section 93.

(4. Processing by Thermal Displacement Compensating Device)

Next, the processing by the thermal displacement compensating device 90 will be described with reference to FIG. 4. The processing by the thermal displacement compensating device 90 is executed after the electric power is supplied to the machine tool 1. For example, the thermal displacement compensation processing is performed during the machining of the workpiece W or at the time of the measurement of the workpiece W by a touch probe (not shown).

Figure 4:
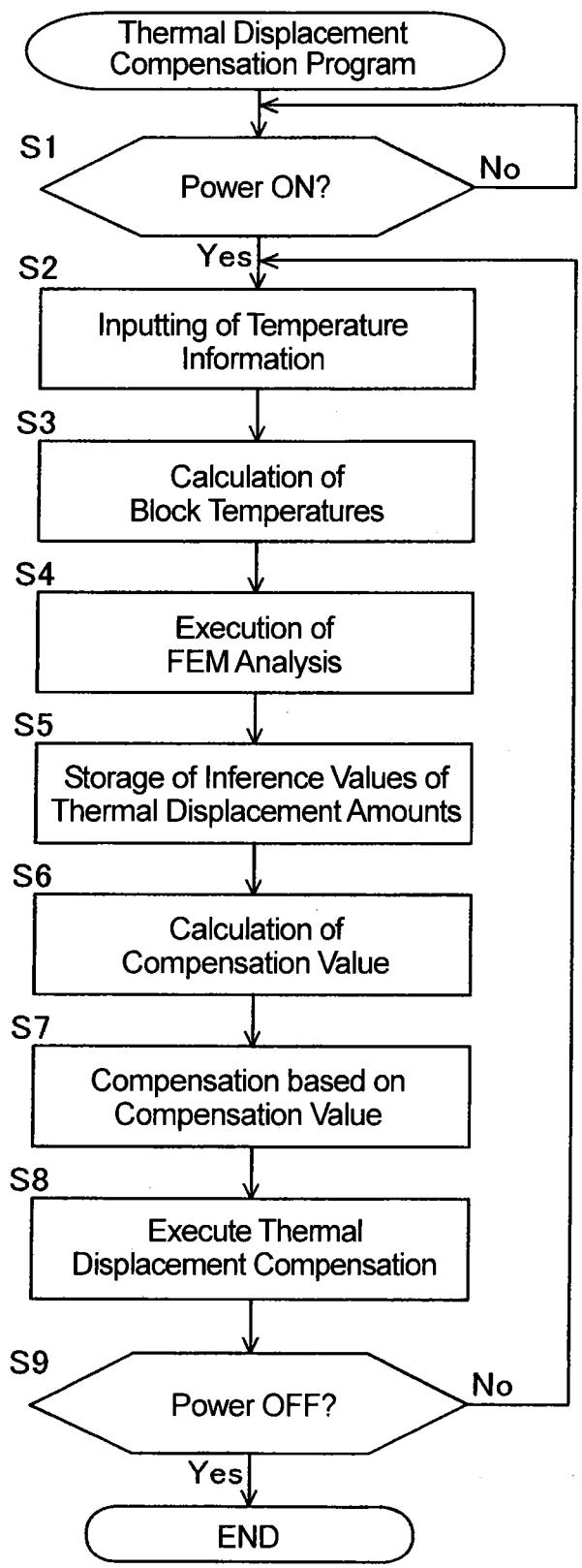
FIG. 4 is a flowchart showing the operation of the thermal displacement compensating device.

As shown in FIG. 4, when the electric power is supplied to the machine tool 1 (step S1), the temperature information on the column 20 is successively inputted from the temperature sensors 70 at the block temperature obtaining section 91 (step S2). Subsequently, the temperature information on the respective blocks 100, 100 is calculated at the block temperature obtaining section 91 (step S3). Where the temperature information on the respective blocks 100, 100 can be inputted directly from the temperature sensors 70, the block temperature obtaining section 91 uses the temperature information as it is and hence, is not required to make such calculation.

Subsequently, the FEM analysis section 92 executes a structural analysis by the finite element method in accordance with the expression (1) (step S4). Then, the FEM analysis section 92 stores inference values obtained of the thermal displacement amounts of the Y-axis sliding surface 20a of the column 20 (step S5). Then, the compensation value calculation section 93 calculates a compensation value for a command position of the end of the rotational tool spindle 40 based on the inference values of the thermal displacement amounts of the Y-axis sliding surface 20a (step S6). For example, the thermal displacement amount of the end position of the rotational tool spindle 40 is calculated based on the present Y-axis position of the saddle 30 and the inference value of the thermal displacement amount of the sliding surface 20 corresponding to the Y-axis position. The thermal displacement amount calculated in this manner of the end position of the rotational tool spindle 40 becomes a compensation value for the command position of the end of the rotational tool spindle 40.

Further, the command position of the end of the rotational tool spindle 40 is compensated by the calculated compensation value (step S7). That is, the command position outputted by the controller 80 is compensated by the compensation value as a compensated command position. Further, the controller 80 executes the thermal displacement compensation (step S8), and continues the processing until the electric power to the machine tool 1 is cut off (step S9). That is, unless the electric power to the machine tool 1 is cut off, return is made to step S2 to repeat the aforementioned processing. When the electric power to the machine tool 1 is cut off, the thermal displacement compensating program is finished.

(5. Derivation Method for Structural Analysis Equation by FEM Analysis Section)

A fundamental equation for a structural analysis by a finite element method is expressed by the expression (2). This expression (2) is a stiffness equation for a structural body. Here, the stiffness matrix [K] is a known value obtained from a material constant or property of the column 20 and the shape of the column 20. The notation in the expression (2) indicates the number of rows and the number of columns or the number of elements. Further, the vectors used in the present description all means column vectors.

[Mathematical Expression 2]

$$N_{all}\{f\} = N_{all}\begin{bmatrix} N_{all} \\ K \end{bmatrix}\{\delta_{all}\} \quad (2)$$

$\{f\}$: External force vectors at respective nodes (number of elements: $N_{all}$)

[K]: Stiffness matrix (number of rows: $N_{all}$, number of columns: $N_{all}$)

$\{\delta_{all}\}$: Displacement vectors at respective nodes (number of elements: $N_{all}$)

Further, a relational expression for nodal forces depending on nodal temperatures is expressed by the expression (3). Here, a nodal force matrix [F] is a known value obtained from the material constant or property of the column 20 and the shape of the column 20. The notation in the expression (3) indicates the number of rows and the number of columns or the number of elements.

[Mathematical Expression 3]

$$N_{all}\{f\} = N_{all}\begin{bmatrix} N_{all} \\ F \end{bmatrix}\{T_{all}\} \quad (3)$$

$\{f\}$: External force vectors at respective nodes (number of elements: $N_{all}$)

[F]: Nodal force coefficient matrix (number of rows: $N_{all}$, number of columns: $N_{all}$)

$\{T_{all}\}$: Temperature vectors at respective nodes (number of elements: $N_{all}$)

Since the left-hand sides of the expressions (2) and (3) are common, the thermal displacement amount vectors $\{\delta_{all}\}$ at the respective nodes are expressed like the expression (4).

That is, the thermal displacement amount vectors $\{\delta_{all}\}$ at the respective nodes in the expression (4) correspond to the thermal displacement amounts at the respective nodes. Here, for simplification in the later description, the multiplied matrices of the inverse matrix of the stiffness matrix [K] with the nodal force coefficient matrix [F] are expressed as [P], as shown in expression (5).

[Mathematical Expression 4]

$$\{\delta_{all}\} = \begin{bmatrix} K \end{bmatrix}^{-1} \begin{bmatrix} F \end{bmatrix} \{T_{all}\} \quad (4)$$

[Mathematical Expression 5]

$$\{\delta_{all}\} = \begin{bmatrix} P \end{bmatrix} \{T_{all}\} \quad (5)$$

A very large number of times for calculations are required in order to calculate the thermal displacement amount vectors $\{\delta\}$ at the respective nodes, that is, the thermal displacement amounts at the respective nodes based on the expression (5). As a result, the time for the calculations becomes a long time. On the other hand, in the present embodiment, the temperatures at all of the nodes in each of the blocks 100 into which that the column 20 is divided to be pluralized are assumed as a uniform value. That is, the kinds of temperatures become the same number as the blocks 100. By so doing, the aforementioned expression (3) regarding the relational expression for the nodal forces corresponding to the nodal temperatures can be expressed as the expression (6) noted below.

[Mathematical Expression 6]

$$N_{all}\{f\} = N_{all} \begin{bmatrix} F1 \end{bmatrix}^{N_{block}} \{T_{block}\} \quad (6)$$

$\{f\}$: External force vectors at respective nodes (number of elements: $N_{all}$)

[F1]: Nodal force coefficient matrix (number of rows: $N_{all}$, number of columns: $N_{block}$)

$\{T_{block}\}$: Temperature vectors at respective blocks (number of elements: $N_{block}$)

By so doing, the aforementioned thermal displacement amount vectors $\{\delta_{all}\}$ at the respective nodes can be expressed like the expression (7). The number of elements for $T_{block}$ in the expression (7) is fewer than that for $T_{all}$ in the expression (4). For this reason, the number of times for calculations in the expression (7) become very few in comparison with that in the expression (4). Further, the multiplied matrices of the inverse matrix of the stiffness matrix [K] with the nodal force coefficient matrix [F1] are expressed as [P1], as shown in the expression (8).

[Mathematical Expression 7]

$$\{\delta_{all}\} = \begin{bmatrix} K \end{bmatrix}^{-1} \begin{bmatrix} F1 \end{bmatrix} \{T_{block}\} \quad (7)$$

[Mathematical Expression 8]

$$\{\delta_{all}\} = \begin{bmatrix} P1 \end{bmatrix} \{T_{block}\} \quad (8)$$

The number of times for calculations in the expression (8) can be greatly decreased in comparison with the number of times for calculations in the aforementioned expression (5) and can be further decreased by doing as follows. The thermal displacement amount vectors $\{\delta_{all}\}$ represent the thermal displacement amounts at all of the nodes on the column 20. However, the portions necessary for the thermal displacement compensation are not all of parts on the column 20, and hence, it suffices to grasp the thermal displacement amounts at the Y-axis sliding surface 20a of the column 20. Therefore, the thermal displacement amount vectors $\{\delta_{all}\}$ in the expression (8) can be expressed as those in the expression (9) when expressed to be divided into the thermal displacement vectors $\{\delta_{part1}\}$ at the nodes of the Y-axis sliding surface 20a portion on the column 20 and the thermal displacement vectors $\{\delta_{part2}\}$ at the nodes of other portions.

[Mathematical Expression 9]

$$\left\{\begin{bmatrix}\delta_{part1}\\ \delta_{part2}\end{bmatrix}\right\} = \begin{bmatrix}\begin{bmatrix}P1_{part1}\end{bmatrix}\\ \begin{bmatrix}P1_{part2}\end{bmatrix}\end{bmatrix}\{T_{block}\} \quad (9)$$

Then, the expression (9) can be expressed as the expression (10) by extracting the thermal displacement amount vectors $\{\delta_{part1}\}$ only which are at the nodes of the Y-axis sliding surface 20a portion of the column 20.

[Mathematical Expression 10]

$$\{\delta_{part1}\} = [P1_{part1}]\{T_{block}\} \quad (10)$$

It is grasped that the number of times for calculations in the expression (10) can greatly be decreased even in comparison with the number of times for calculations in the expression (8). That is, the number of times for calculations in the expression (10) becomes extremely fewer than the number of times for calculations in the expression (5). The expression (10) is the same expression as the aforementioned expression (1). That is, the expression (1) is derived in this manner.

Then, by performing a structural analysis by the finite element method by the use of the aforementioned expression (1), it can be realized to speed up the calculation speed of the thermal displacement amount vectors $\{\delta_{part1}\}$ at the nodes which are required for compensating the machining command position. Then, it is possible to perform the thermal displacement compensation as the calculations are made on the real time basis during a machining. In this way, the structural analysis by the finite element method can be performed at a high speed, and thus, it is possible to perform the thermal displacement compensation accurately on the real time basis. The expression (8) may be used where the calculation speed in performing the structural analysis by the finite element method by the use of the expression (8) is sufficiently high. However, in comparison with the expression (8), the use of the expression (1) can reliably make it possible to speed up the calculations.

Further, the plurality of blocks 100, 100, ... into which the column 20 is divided are formed by dividing the column 20 into the sliding surface side and the non-sliding surface side of the column 20. In general, where a structural body of a machine tool has a sliding surface that enables a movable body to slide thereon, there occurs a temperature gradient between a sliding surface side and a non-sliding surface side due to the difference in thermal capacity between the sliding surface side and the non-sliding surface side, the influence of heat generation and the like. Therefore, by separating the sliding surface side from the non-sliding surface side in dividing the column 20 into the plurality of the blocks 100, it is possible to grasp a state close to actual temperatures even where the temperatures in each block 100 are defined as a uniform value. As a result, it is possible to infer the thermal displacement amounts accurately.

Second Embodiment

In the foregoing embodiment, the thermal displacement amounts of the column 20 are inferred regardless of the X-axis position of the column 20, and the thermal displacement amount of the end position of the rotational tool spindle 40 is calculated by using the inference values. In the present embodiment, the thermal displacement amount of the end position of the rotational tool spindle 40 is calculated to become a value which differs in dependence on the X-axis position of the column 20. Here, the details will be described.

Figure 5:
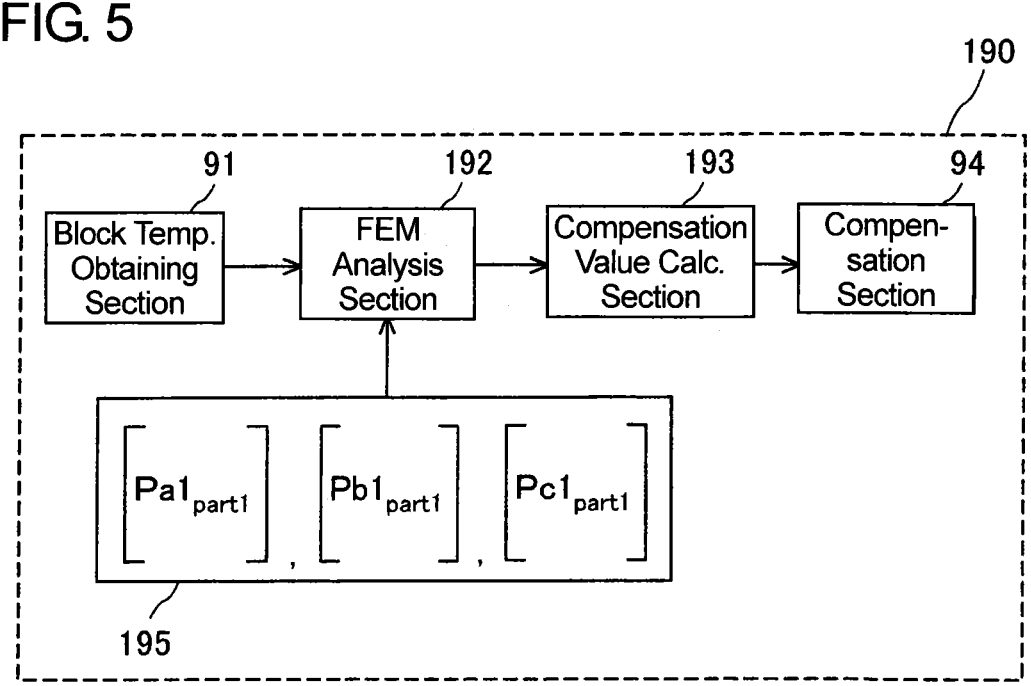
FIG. 5 is a diagram showing a thermal displacement compensating device in a second embodiment of the present invention.

As shown in FIG. 5, a thermal displacement compensating device 190 in the present embodiment is composed of the block temperature obtaining section 91, a memory section 195, an FEM analysis section 192, a compensation value calculation section 193 and the compensating section 94. Here, in the respective components, the same components as those in the foregoing embodiment will be given the same reference numerals and will be omitted from description.

Figure 6A:
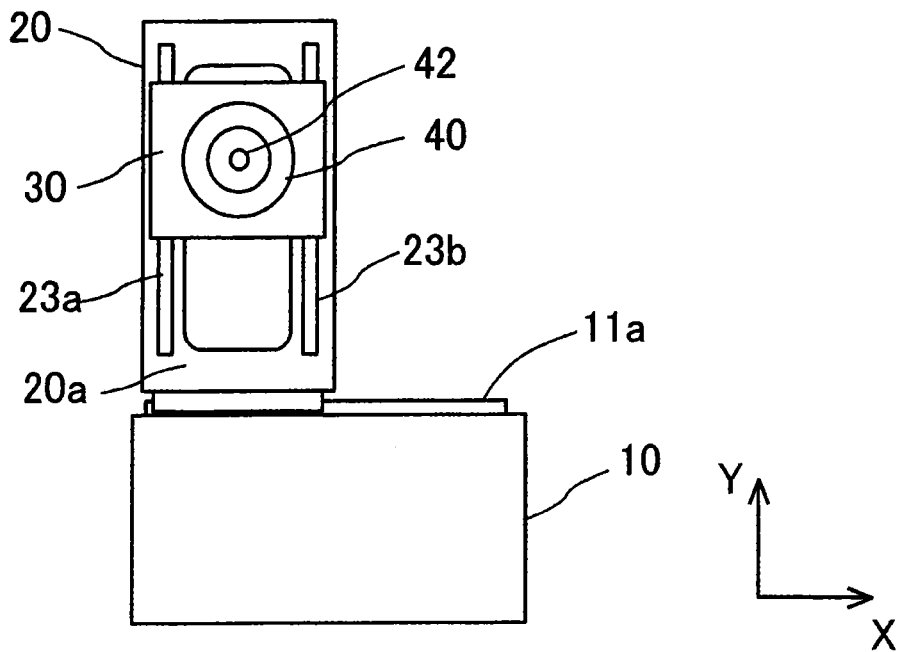
FIG. 6A is a view showing the position of a column when the X-axis position is Xa.
Figure 6B:
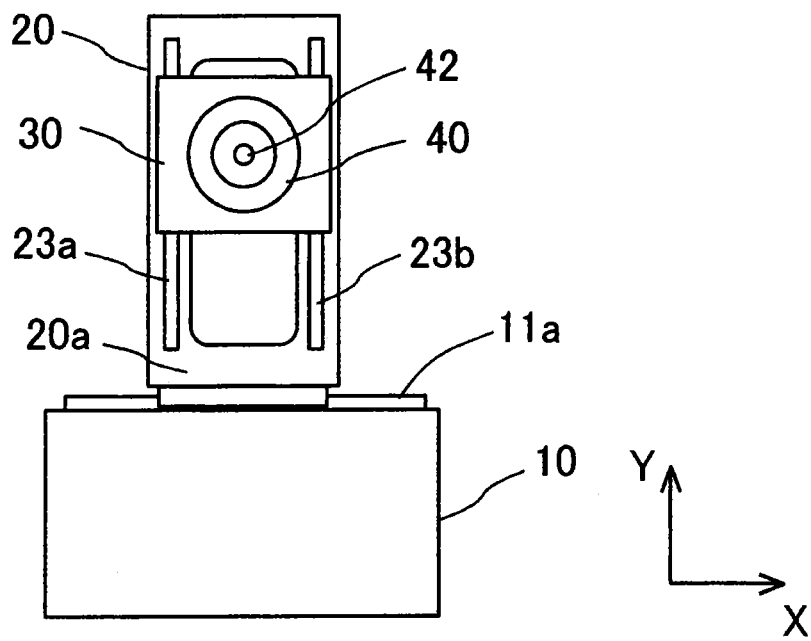
FIG. 6B is a view showing the position of the column when the X-axis position is Xb.
Figure 6C:
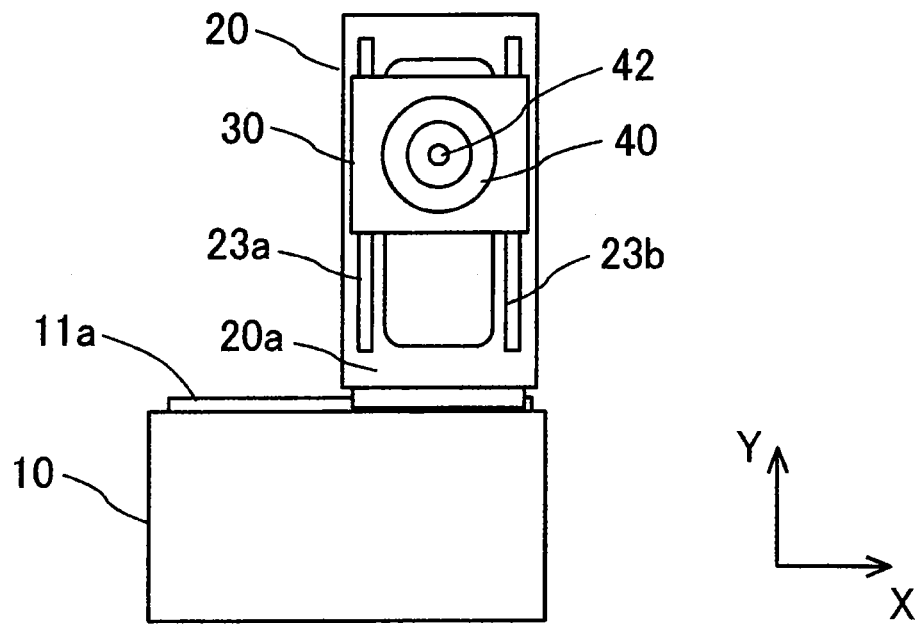
FIG. 6C is a view showing the position of the column when the X-axis position is Xc.

The memory section 195 stores a plurality of coefficient matrices $[Pa1_{part1}]$, $[Pb1_{part1}]$, $[Pc1_{part1}]$ corresponding to a plurality of reference positions Xa, Xb, Xc of the column 20. Here, FIG. 6A shows the state that the column 20 is at the reference position Xa, FIG. 6B shows the state that the column 20 is at the reference position Xb, and FIG. 6C shows the state that the column 20 is at the reference position Xc.

The supporting stiffness of the column 20 differs in dependence on the X-axis position of the column 20. That is, the stiffness matrix [K] differs in dependence on the X-axis position of the column 20. Accordingly, as shown in the expression (7), the coefficient matrix $[P1_{part1}]$ is a function of the stiffness matrix [K] and thus, differs in dependence on the X-axis position of the column 20. Therefore, the plurality of coefficient matrices $[Pa1_{part1}]$, $[Pb1_{part1}]$, $[Pc1_{part1}]$ that correspond to the plurality of reference positions Xa, Xb, Xc of the column 20 as shown in FIGS. 6A-6C are set and stored in advance.

The FEM analysis section 192 performs the structural analysis of the column 20 by the finite element method based on the temperatures $\{T_{block}\}$ of the respective blocks 100 calculated by the block temperature obtaining section 91 and the plurality of coefficient matrices $[Pa1_{part1}]$, $[Pb1_{part1}]$, $[Pc1_{part1}]$ stored in the memory section 195 and infers the thermal displacement amounts of the Y-axis sliding surface 20a of the column 20.

Figure 7:
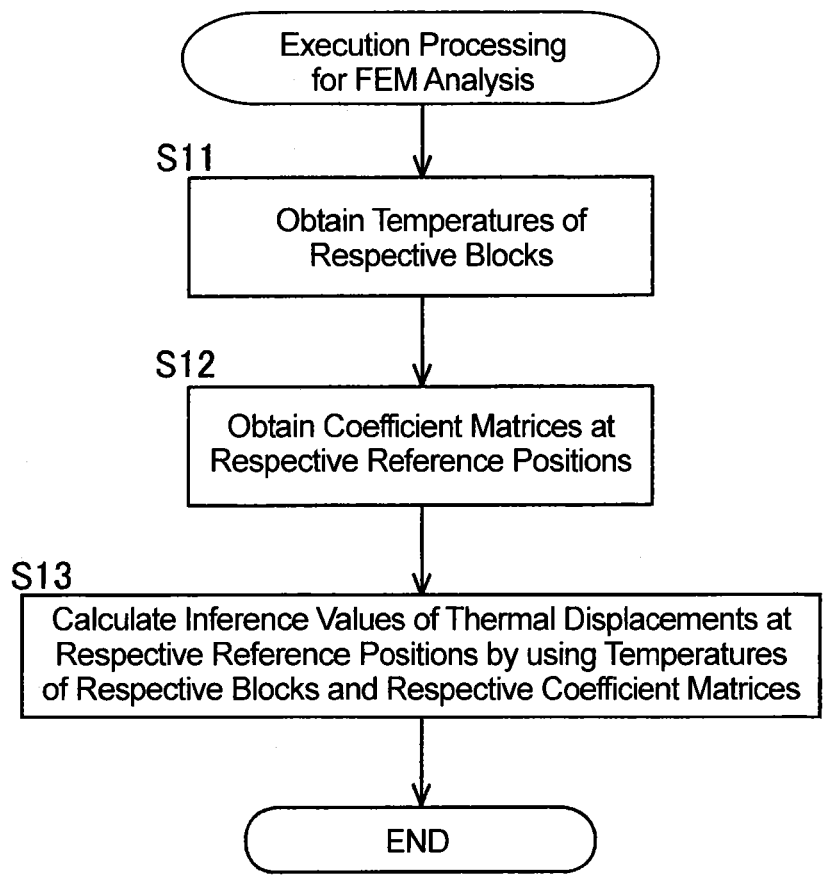
FIG. 7 is a flowchart showing an execution processing in an FEM analysis section in the second embodiment.

The processing by the FEM analysis section 192 will be described with reference to FIG. 7. As shown in FIG. 7, the FEM analysis section 192 obtains the temperatures of the respective blocks 100 calculated by the block temperature obtaining section 91 (step S11). Then, the section 192 obtains the plurality of coefficient matrices $[Pa1_{part1}]$, $[Pb1_{part1}]$, $[Pc1_{part1}]$ corresponding to the respective reference positions Xa, Xb, Xc from the memory section 195 (step S12).

Thereafter, by the use of the temperatures $\{T_{block}\}$ of the respective blocks 100 and the respective coefficient matrices $[Pa1_{part1}]$, $[Pb1_{part1}]$, $[Pc1_{part1}]$, the thermal displacement amount vectors $\{\delta a_{part1}\}$, $\{\delta b_{part1}\}$, $\{\delta c_{part1}\}$ at the respective reference positions Xa, Xb, Xc are calculated in accordance with the expressions (11), (12), (13) (step S13).

[Mathematical Expression 11]

$$\{\delta a_{part1}\}=[Pa1_{part1}]\{T_{block}\} \quad (11)$$

[Mathematical Expression 12]

$$\{\delta b_{part1}\}=[Pb1_{part1}]\{T_{block}\} \quad (12)$$

[Mathematical Expression 13]

$$\{\delta c_{part1}\}=[Pc1_{part1}]\{T_{block}\} \quad (13)$$

The compensation value calculation section 193 calculates a compensation value for a machining command position of the end of the rotational tool spindle 40 by an interpolation method based on the thermal displacement amount vectors $\{\delta a_{part1}\}$, $\{\delta b_{part1}\}$, $\{\delta c_{part1}\}$ of the column 20 at the respective reference positions Xa, Xb, Xc and the present position of the column 20.

Figure 8:
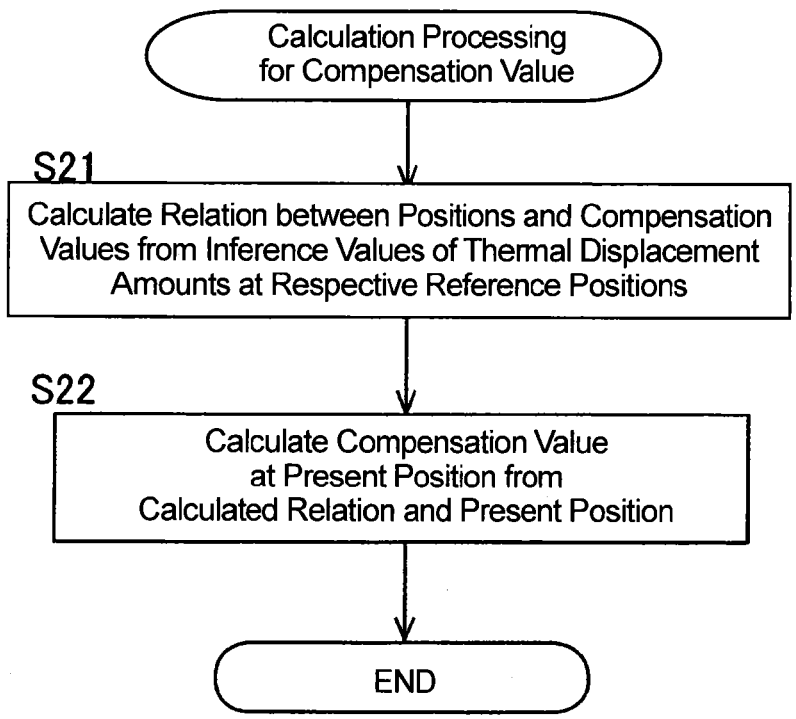
FIG. 8 is a flowchart showing a calculation processing for a compensation value in the second embodiment.
Figure 9:
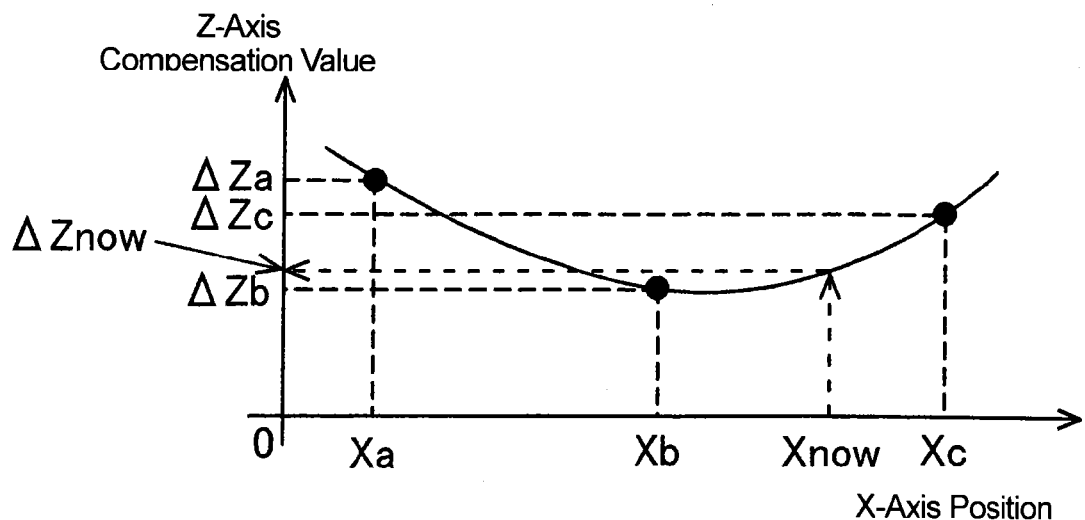
FIG. 9 is a graph representing the relation between X-axis position and Z-axis compensation value for the column.

This processing will be described with reference to FIGS. 8 and 9. As shown in FIG. 8, the compensation values (here, Z-axis compensation values) for the machining command position of the end of the rotational tool spindle 40 are calculated from the thermal displacement amount vectors $\{\delta a_{part1}\}$, $\{\delta b_{part1}\}$, $\{\delta c_{part1}\}$ at the respective reference positions Xa, Xb, Xc. As shown in FIG. 9, these compensation values become ΔZa, ΔZb, ΔZc. The relation between X-axis position and Z-axis compensation value is calculated from these compensation values ΔZa, ΔZb, ΔZc (step S21).

For example, the calculation in accordance with an approximate equation by the least square method is applicable to the calculation for this relation. For example, where three or more points are set as the reference positions, there may be used a quadratic approximation or a first order approximation. That is, by the use of the compensation values ΔZa, ΔZb, ΔZc corresponding to the three-point reference positions, compensation values corresponding to X-axis positions therebetween are calculated by the interpolation method.

Subsequently, as shown in FIGS. 8 and 9, a compensation value $\Delta Z_{now}$ at the present position is calculated from the calculated relation and the present position $X_{now}$ (step S22). In this manner, it is possible to accurately calculate the compensation value $\Delta Z_{now}$ corresponding to the present X-axis position $X_{now}$ of the column 20. Then, the compensation section 94 compensates a machining command position by the compensation value $\Delta Z_{now}$ obtained in the compensation value calculation section 193.

As mentioned above, the column 20 movable relative to the bed 10 differs in supporting stiffness in dependence on the X-axis position. According to the present embodiment, the thermal displacement amount vectors $\{\delta a_{part1}\}$, $\{\delta b_{part1}\}$, $\{\delta c_{part1}\}$ of the column 20 are inferred by the use of the plurality of coefficient matrices $[Pa1_{part1}]$, $[Pb1_{part1}]$,

[Pc1$_{part1}$] corresponding to the supporting stiffness at the plurality of reference positions Xa, Xb, Xc.

Here, where the present position X$_{now}$ corresponds to the reference position Xa, Xb or Xc, the thermal displacement vector {δa$_{part1}$}, {δb$_{part1}$} or {δc$_{part1}$} of the column 20 is inferred by the use of the coefficient matrix [Pa1$_{part1}$], [Pb1$_{part1}$] or [Pc1$_{part1}$] itself at the reference position Xa, Xb or Xc, and a compensation value for a machining command position of the end of the rotational tool spindle 40 is calculated by the use of the inferred thermal displacement amount vector. The compensation value calculated at this time corresponds to the compensation value ΔZ$_{now}$ itself at the present position X$_{now}$.

On the other hand, where the present position X$_{now}$ does not correspond to the reference position Xa, Xb or Xc, a compensation value ΔZ$_{now}$ is calculated by the interpolation method based on the thermal displacement amount vectors {δa$_{part1}$}, {δb$_{part1}$} and {δc$_{part1}$} of the column 20 calculated from the plurality of reference positions Xa, Xb, Xc. In this manner, through the calculation by the interpolation method, it is possible to accurately calculate the compensation value ΔZ$_{now}$ at the present position X$_{now}$.

Third Embodiment

Figure 10:
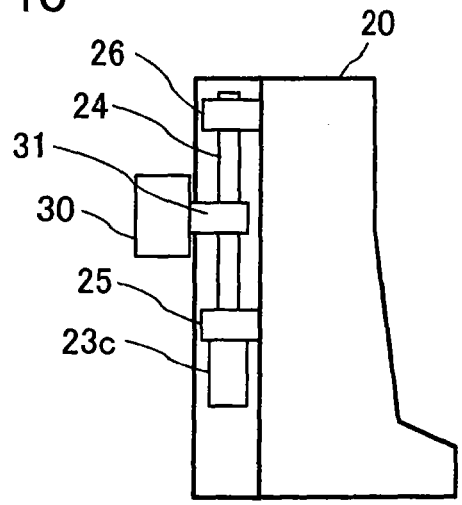
FIG. 10 is a view showing a supporting reference position for the column in a third embodiment of the present invention.

In the foregoing embodiment, the FEM analysis section 92 is configured to calculate the thermal displacement amount vectors {δ} at the nodes of the Y-axis sliding surface 20a of the column 20. Besides, as shown in FIG. 10, the FEM analysis section 92 may be configured to calculate the thermal displacement vectors {δ} of the nodes at a supporting reference position of a Y-axis ball screw 24 which is for moving the saddle 30 relative to the column 20.

Here, the coupling structure for the column 20 and the saddle 30 will be described with reference to FIG. 10. In the column 20, the Y-axis ball screw 24 is supported by a reference support member 25 and an auxiliary support member 26 on a main body of the column 20 at both ends thereof. In general, ball screws expand in the axial direction when heated. Where expansion occurs like this, a portion supported by the reference support member 25 of the Y-axis ball screw 24 does not change in position, whereas another portion supported by the auxiliary support member 26 of the Y-axis ball screw 24 expands. The saddle 30 is provided with a ball screw nut 31 and is in screw engagement with the Y-axis ball screw 24.

Further, the supporting reference position means the portion supporting the Y-axis ball screw 24 by the reference support member 25. That is, in the FEM analysis section 92, the thermal displacement amount vectors {δ} at nodes are calculated regarding the portion that supports the Y-axis ball screw 24 by the reference support member 25. Then, the compensation value calculation section 93 calculates a compensation value for a machining command position based on the calculated thermal displacement vectors {δ}.

According to the present embodiment, in the same manner as is done in the foregoing embodiment, the thermal displacement amount vectors {δ} at all of nodes of the column 20 are not calculated, but the thermal displacement amount vectors {δ} at a part of the nodes are calculated. Thus, the number of times for calculations becomes very few. Accordingly, it is possible to process the structural analysis by the finite element method at a high speed.

Further, the FEM analysis section 92 may be configured to calculate the thermal displacement amount vectors {δ} of the nodes at the supporting reference position calculated in the third embodiment, in addition to the thermal displacement amount vectors {δ} of the nodes at the Y-axis sliding surface 20a calculated in the first embodiment. Thus, it is possible to perform the thermal displacement compensation for machining command positions further accurately.

Fourth Embodiment

Figure 11:
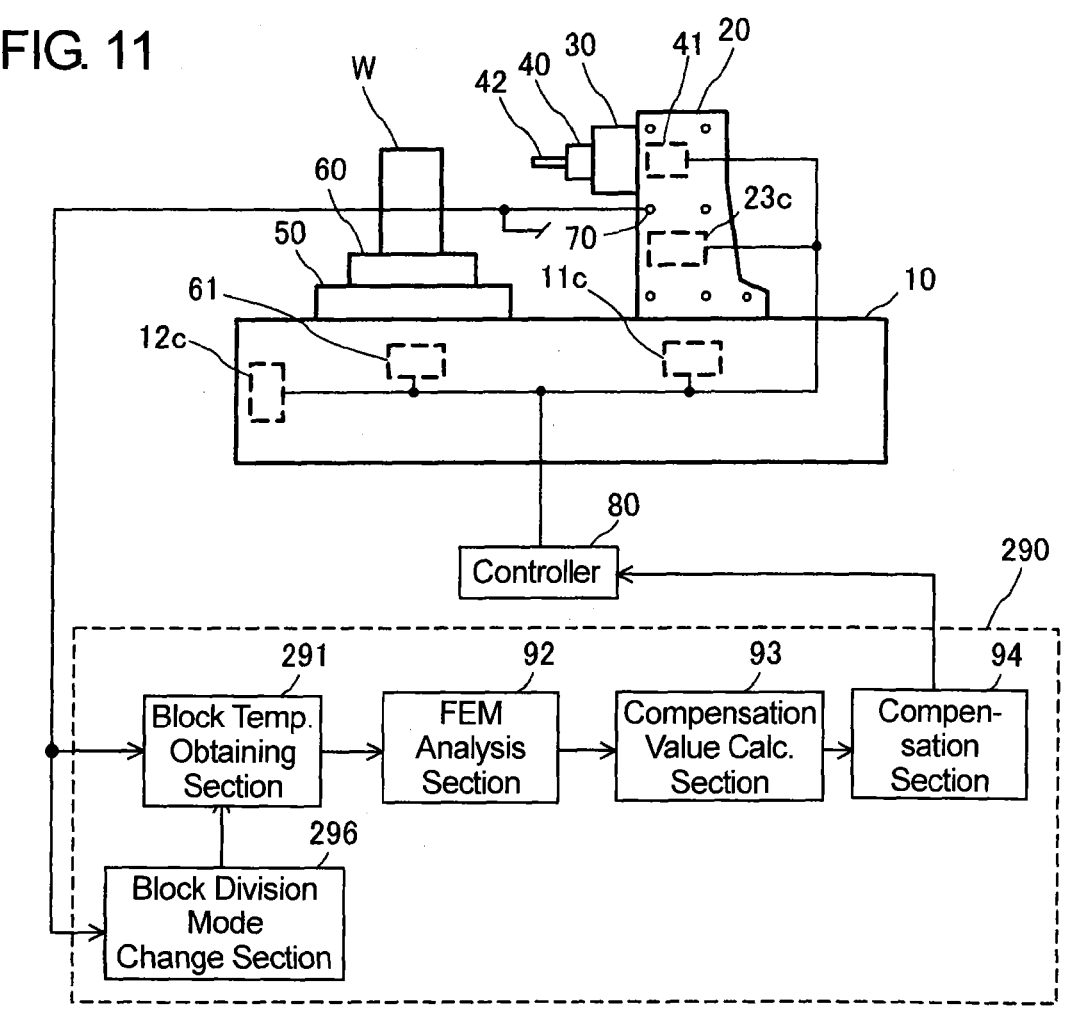
FIG. 11 is a diagram showing a thermal displacement compensating device in a fourth embodiment of the present invention.

In the foregoing embodiments, the block temperature obtaining section 91 shown in FIG. 2 is made to obtain the temperatures of the respective blocks 100, 100, . . . determined in advance. Besides, the block temperature obtaining section 91 may be configured to properly change the mode of division into the respective blocks 100 based on information concerning the actual temperatures on the structural body and thereafter, to obtain the temperature information on the respective blocks 100, 100 . . . so changed. This embodiment will be described with reference to FIG. 11. Here, the same components in FIG. 11 as those in the first embodiment will be given the same reference numerals and will be omitted from description.

A thermal displacement compensating device 290 in the present embodiment is composed of a block division mode change section 296, a block temperature obtaining section 291, the FEM analysis section 92, the compensation value calculation section 93 and the compensation section 94.

The block division mode change section 296 changes the division mode of the blocks 100, 100, . . . based on the temperature information on respective portions of the column 20 detected by the temperature sensors 70. Specifically, the block division mode change section 296 defines the respective blocks 100, 100, . . . so that the range of temperatures in the same block 100 is covered within a preset range. The number of the blocks into which the division is made increases where the temperature gradient on the column 20 is large as a whole, whereas the number of the blocks into which the division is made becomes few where the temperature gradient on the column 20 is small as a whole. Further, where the vibration at a part within the temperature distribution is larger, the number of the blocks into which the division is made increases. Then, the block temperature obtaining section 291 obtains the temperatures of the respective blocks 100, 100, . . . for which the division mode has properly been changed by the block division mode change section 296. Other constructions are the same as those in the foregoing embodiments.

As described above, even where the temperatures in the same block 100 in the structural analysis by the finite element method are defined to a uniform value, it is possible to grasp the respective temperatures in the state close to the actual temperatures on the column 20. Consequently, it is possible to infer the thermal displacement amounts accurately.

DESCRIPTION OF SYMBOLS

1: machine tool, 10: bed, 20: column, 20a: Y-axis sliding surface, 25: reference support member, 26: auxiliary support member, 30: saddle, 30a: side surface, 31: nut,
40: rotational tool spindle, 42: tool, 50: table, 60: turn table, 70: temperature sensor, 80: controller, 90, 190, 290: thermal displacement compensating device, 91, 291: block temperature obtaining section, 92, 192: FEM analysis section, 93, 193: compensation value calculation section, 94: compensation section, 195: memory section, 296: block division mode change section, 100: block

The invention claimed is:

1. A thermal displacement compensating device for a machine tool, comprising:

temperature sensors arranged at predetermined portions on a structural body of the machine tool;

block temperature obtaining means that obtains temperatures of respective blocks based on temperature information detected by the temperature sensors, the structural body of the machine tool divided into the respective blocks;

finite element method analysis means that performs a structural analysis by a finite element method based on the temperatures of the respective blocks obtained by the block temperature obtaining means that infers thermal displacement amounts of the structural body of the machine tool, wherein the finite element method analysis utilizes a plurality of nodes within each of the blocks, each node associated with a respective nodal temperature, each block associated with a respective range of temperatures within the block, and the temperatures in each of the respective block are assigned a uniform value;

compensation value calculation means that calculates a compensation value for a command position by a numerical control (NC) program of a movable body of the machine tool based on the thermal displacement amounts of the structural body of the machine tool inferred by the finite element method analysis means;

compensation means that compensates the command position by the compensation value obtained by the compensation value calculation means, and block change means that changes a division mode of the blocks based on temperature information detected by the temperature sensors and so that the range of temperatures associated with each block is covered within a preset range.

2. The thermal displacement compensating device for a machine tool in claim 1, wherein:

the finite element method analysis means performs the structural analysis by the finite element method and infers thermal displacement amounts at a part of nodes on the structural body of the machine tool; and the compensation value calculation means calculates the compensation value based on the inferred thermal displacement amounts at the part of the nodes on the structural body of the machine tool.

3. The thermal displacement compensating device for a machine tool in claim 2, wherein where the structural body of the machine tool has a sliding surface for sliding another movable body of the machine tool thereon and a non-sliding surface side such that a temperature gradient exists between the sliding surface and a non-sliding surface side, the part of the nodes are nodes residing at the sliding surface that is on the structural body of the machine tool for sliding the movable body of the machine tool thereon.

4. The thermal displacement compensating device for a machine tool in claim 2, wherein:

the part of the nodes are at a supporting reference position for a ball screw that moves the movable body of the machine tool relative to the structural body of the machine tool.

5. The thermal displacement compensating device for a machine tool in claim 1, wherein:

the structural body is supported movably relative to a support body;

the thermal displacement compensating device is provided with memory means that stores a plurality of coefficient matrices corresponding to the supporting stiffness at a plurality of reference positions of the structural body; and the finite element method analysis means performs the structural analysis by the finite element method based on the plurality of coefficient matrices and the temperatures of the respective blocks and infers the thermal displacement amounts of the structural body of the machine tool.

6. The thermal displacement compensating device for a machine tool in claim 5, wherein:

the finite element method analysis means infers the thermal displacement amounts of the structural body at the respective reference positions of the structural body based on the plurality of coefficient matrices and the temperatures of the respective blocks; and the compensation value calculation means calculates by an interpolation method a compensation value for a command position of the movable body at the present position of the structural body based on the thermal displacement amounts of the structural body at the respective reference positions and the present position of the structural body.

7. The thermal displacement compensating device for a machine tool in claim 1, wherein where the structural body of the machine tool has a sliding surface for sliding another movable body of the machine tool thereon, the blocks are defined to divide the structural body of the machine tool into the sliding surface side and a non-sliding surface side.

8. The thermal displacement compensating device for a machine tool in claim 2, wherein a number of the nodes is larger than a number of the blocks.

9. A thermal displacement compensating method for a machine tool, comprising:

obtaining temperatures of respective blocks based on temperature information detected by temperature sensors arranged at predetermined portions on a structural body of the machine tool, the structural body of the machine tool divided into the respective blocks;

performing a structural analysis by a finite element method based on the temperatures of the respective blocks obtained during the obtaining and inferring thermal displacement amounts of the structural body of the machine tool based on the structural analysis, wherein the finite element method analysis utilizes a plurality of nodes within each of the blocks, each node associated with a respective nodal temperature, each block associated with a respective range of temperatures within the block, and the temperatures in each of the respective blocks are assigned a uniform value;

calculating a compensation value for a command position by a numerical control (NC) program of a movable body of the machine tool based on the thermal displacement amounts of the structural body of the machine tool inferred during the performing;

compensating the command position by the compensation value obtained during the calculating, and changing a division mode of the blocks based on temperature information detected by the temperature sensors and so that the range of temperatures associated with each block is covered within a preset range.

10. A thermal displacement compensating device for a machine tool, comprising:

temperature sensors arranged at predetermined portions on a structural body of the machine tool; and circuitry configured to:

obtain temperatures of respective blocks based on temperature information detected by the temperature sensors, the structural body of the machine tool divided into the respective blocks;

perform a structural analysis by a finite element method based on the temperatures of the respective blocks obtained by the circuitry and infer thermal displacement amounts of the structural body of the machine tool based on the structural analysis, wherein the finite element method analysis utilizes a plurality of nodes within each of the blocks, each node associated with a respective nodal temperature, each block associated with a respective range of temperatures within the block, and the temperatures in each of the respective blocks are assigned a uniform value;

calculate a compensation value for a command position by a numerical control (NC) program of a movable body of the machine tool based on the thermal displacement amounts of the structural body of the machine tool inferred by the circuitry; and compensate the command position by the compensation value obtained by circuitry and so that the range of temperatures associated with each block is covered within a preset range.

11. The thermal displacement compensating device for a machine tool in claim 10, wherein the circuitry is further configured to:

perform the structural analysis by the finite element method and infers thermal displacement amounts at a part of nodes on the structural body of the machine tool; and calculate the compensation value based on the inferred thermal displacement amounts at the part of the nodes on the structural body of the machine tool.

12. The thermal displacement compensating device for a machine tool in claim 11, wherein where the structural body of the machine tool has a sliding surface for sliding another movable body of the machine tool thereon and a non-sliding surface side such that a temperature gradient exists between the sliding surface and a non-sliding surface side, the part of the nodes are nodes residing at the sliding surface that is on the structural body of the machine tool for sliding the movable body of the machine tool thereon.

13. The thermal displacement compensating device for a machine tool in claim 11, wherein:

the part of the nodes are at a supporting reference position for a ball screw that moves the movable body of the machine tool relative to the structural body of the machine tool.

14. The thermal displacement compensating device for a machine tool in claim 10, wherein:

the structural body is supported movably relative to a support body;

the thermal displacement compensating device is provided with a memory that stores a plurality of coefficient matrices corresponding to the supporting stiffness at a plurality of reference positions of the structural body; and the circuitry is configured to perform the structural analysis by the finite element method based on the plurality of coefficient matrices and the temperatures of the respective blocks and infers the thermal displacement amounts of the structural body of the machine tool.

15. The thermal displacement compensating device for a machine tool in claim 14, wherein the circuitry is further configured to:

infer the thermal displacement amounts of the structural body at the respective reference positions of the structural body based on the plurality of coefficient matrices and the temperatures of the respective blocks; and calculate by an interpolation method a compensation value for a command position of the movable body at the present position of the structural body based on the thermal displacement amounts of the structural body at the respective reference positions and the present position of the structural body.

16. The thermal displacement compensating device for a machine tool in claim 10, wherein where the structural body of the machine tool has a sliding surface for sliding another movable body of the machine tool thereon, the blocks are defined to divide the structural body of the machine tool into the sliding surface side and a non-sliding surface side.

17. The thermal displacement compensating device for a machine tool in claim 10, wherein the circuitry is further configured to change a division mode of the blocks based on temperature information detected by the temperature sensors.

18. The thermal displacement compensating device for a machine tool in claim 11, wherein a number of the nodes is larger than a number of the blocks.

* * * * *